United States Patent
Pretorius (10) Patent No.: US 10,048,482 B2
(45) Date of Patent: *Aug. 14, 2018

(54) ARRANGEMENT FOR LIGHT SHEET MICROSCOPY

(71) Applicant: Carl Zeiss Microscopy GmbH, Jena (DE)

(72) Inventor: Marco Pretorius, Oberkochen (DE)

(73) Assignee: Carl Zeiss Microscopy GmbH, Jena (DE)

( * ) Notice: Subject to any disclaimer, the term of this patent is extended or adjusted under 35 U.S.C. 154(b) by 115 days.

This patent is subject to a terminal disclaimer.

(21) Appl. No.: 15/036,510

(22) PCT Filed: Nov. 13, 2014

(86) PCT No.: PCT/EP2014/074487
§ 371 (c)(1),
(2) Date: Jul. 27, 2016

(87) PCT Pub. No.: WO2015/071361
PCT Pub. Date: May 21, 2015

(65) Prior Publication Data
US 2016/0349495 A1    Dec. 1, 2016

(30) Foreign Application Priority Data
Nov. 15, 2013   (DE) ......................... 10 2013 112 595

(51) Int. Cl.
*G02B 21/08* (2006.01)
*G02B 27/00* (2006.01)
(Continued)

(52) U.S. Cl.
CPC ......... *G02B 21/08* (2013.01); *G02B 13/0095* (2013.01); *G02B 13/18* (2013.01);
(Continued)

(58) Field of Classification Search
CPC .... G02B 21/08; G02B 13/0095; G02B 13/18; G02B 21/02; G02B 21/33; G02B 27/0025;
(Continued)

(56) References Cited

U.S. PATENT DOCUMENTS

2004/0173760 A1    9/2004  Kino et al.

FOREIGN PATENT DOCUMENTS

DE          102 57 423       6/2004
DE     10 2012 101 262       4/2013
(Continued)

OTHER PUBLICATIONS

J. Huisken et al. "Selective Plane Illumination Microscopy Techniques in Developmental Biology", published in 2009 in the journal *Development*, 136, pp. 1963-1975.
(Continued)

*Primary Examiner* — Bumsuk Won
*Assistant Examiner* — Wen Huang
(74) *Attorney, Agent, or Firm* — Haug Partners LLP (57) ABSTRACT

An arrangement for light sheet microscopy including illumination optics with an illumination objective for illuminating a sample, located in a medium on a sample carrier aligned with respect to a plane reference surface, with a light sheet. The arrangement further includes detection optics with a detection objective. The arrangement also includes a separating layer system with at least one layer separating the medium from the illumination and detection objectives. The separating layer system is aligned with a base surface parallel to the reference surface and contacts the medium by this base surface. At least one detection corrective lens, for reducing those aberrations occurring as a result of light to be detected passing obliquely through interfaces of the separating layer system, is configured as free-form lens and is
(Continued)

arranged between the detection objective and the separating layer system. Alternatively, it also forms the front lens of the detection objective.

18 Claims, 7 Drawing Sheets

(51) Int. Cl.
*G02B 21/02* (2006.01)
*G02B 13/00* (2006.01)
*G02B 13/18* (2006.01)
*G02B 21/33* (2006.01)
*G02B 21/00* (2006.01)
*G02B 21/36* (2006.01)

(52) U.S. Cl.
CPC ............ *G02B 21/02* (2013.01); *G02B 21/33* (2013.01); *G02B 27/0025* (2013.01); *G02B 27/0068* (2013.01); *G02B 21/0052* (2013.01); *G02B 21/0076* (2013.01); *G02B 21/367* (2013.01)

(58) Field of Classification Search
CPC ............ G02B 27/0068; G02B 21/0052; G02B 21/0076; G02B 21/367; G02B 21/18; G02B 21/0032

USPC .................. 359/372, 374, 385, 398, 724
See application file for complete search history.

(56) References Cited

FOREIGN PATENT DOCUMENTS

| DE | 10 2013 107 297.6 | 1/2015 |
|----|-------------------|--------|
| EP | 0 866 993 | 9/1998 |
| EP | 2437117 | 4/2012 |
| WO | WO 0210833 | 2/2002 |
| WO | WO 2004/053558 | 6/2004 |
| WO | WO 2012/110488 | 8/2012 |
| WO | WO 2012/122027 | 9/2012 |
| WO | WO 2015/004107 | 1/2015 |

OTHER PUBLICATIONS

International Search Report for Application No. PCT/EP2014/074487 dated Feb. 2, 2015.

Notification of Transmittal of Translation of the International Preliminary Report on Patentability for Application No. PCT/EP2014/074487 dated May 17, 2016.

Fig.5c

ARRANGEMENT FOR LIGHT SHEET MICROSCOPY

The present application claims priority from PCT Patent Application No. PCT/EP2014/074487 filed on Nov. 13, 2014, which claims priority from German Patent Application No. DE 10 2013 112 595.6 filed on Nov. 15, 2013, the disclosures of which are incorporated herein by reference in their entirety.

FIELD OF THE INVENTION

It is noted that citation or identification of any document in this application is not an admission that such document is available as prior art to the present invention.

The invention is directed to an arrangement for light sheet microscopy. An arrangement of this kind comprises illumination optics with an illumination objective for illuminating a sample with a light sheet via an illumination beam path, which sample is located on a sample carrier in a medium. The optical axis of the illumination objective and the light sheet lie in a plane which forms an illumination angle β not equal to zero with the normal lines of a plane reference surface with respect to which the sample carrier—occasionally also formed as sample vessel with side walls for receiving liquids—is aligned. The arrangement further comprises detection optics with a detection objective in a detection beam path. In this case, also, the optical axis of the detection objective forms a detection angle δ not equal to zero with the normal lines of the reference surface. Further, the arrangement includes a separating layer system with at least one layer made of a predetermined material with predetermined thickness which separates the medium from the illumination objective and the detection objective. The separating layer system is aligned with a base surface parallel to the reference surface and contacts the medium by this base surface at least in the region which is accessible to the illumination objective and the detection objective for illuminating and detecting. In the simplest case, the separating layer system can be an air layer which separates the objectives from the medium. The separating layer system is often the bottom of the sample vessel when the objectives are arranged under it, or is a corresponding cover plate or a coverslip with an air layer in each instance separating the bottom or coverslip from the objective. If the objectives are designed as immersion objectives, the immersion medium, instead of air, is between the coverslip or bottom of the sample vessel. Finally, the arrangement also comprises a detection corrective lens system with at least one detection corrective lens for reducing those aberrations which occur because the light to be detected passes obliquely through interfaces of the separating layer system. Normally, the illumination objective and detection objective are two different objectives, but they can also be designed as a so-called double-objective such as is described, for example, in EP 0 866 993 B1. In this case, the two objectives are put together in a shared constructional unit, and the respective optics—i.e., objectives with associated beam paths and optical elements arranged therein-share some elements.

A device of this type is used particularly in the examination of biological samples in which the sample is illuminated by a light sheet, the plane of which intersects the optical axis of detection at an angle not equal to zero. The light sheet typically forms a right angle with the detection direction which generally corresponds to the optical axis of the detection objective. Spatial recordings of even thick samples can be made relatively quickly with this technique, also referred to as SPIM (selective plane illumination microscopy). A graphic, spatially extensive representation of the sample is made possible based on optical sections combined with a relative movement in a direction perpendicular to the section plane.

The SPIM technique is preferably used in fluorescence microscopy, in which connection it is also referred to as LSFM (light sheet fluorescence microscopy). The sample is uniformly illuminated in lateral direction, and a selective imaging, i.e., an imaging with low depth of field, is then possible in the direction perpendicular to the light sheet. The LSFM technique has a number of advantages over other established methods such as confocal laser scanning microscopy or two-photon microscopy. Since widefield detection can be carried out, larger sample regions can be acquired. Although the resolution is somewhat lower than in confocal laser scanning microscopy, the LSFM technique can be used to analyze thicker samples because the penetration depth is greater. Further, this method has the least light stress on the samples, which, among other things, reduces the risk of photobleaching of the sample because the sample is only illuminated by a thin light sheet at an angle to the detection direction not equal to zero.

Both a static light sheet, which is generated, for example, by means of cylindrical lenses, or a quasistatic light sheet can be used. This quasistatic light sheet can be generated through fast scanning of the sample with a light beam. The light sheet-type illumination is brought about in that the light beam undergoes a very fast relative movement with respect to the sample to be observed and is thus strung together over and over in a temporally consecutive manner. The integration time of the camera on whose sensor the sample is ultimately imaged is selected such that the scanning is concluded within the integration time. Instead of a camera with a two-dimensional array, a line sensor combined with a renewed scanning (rescan) can also be used in the detection optics. Further, confocal detection can also be carried out.

The SPIM technique has been described many times in the literature, for example, in DE 102 57 423 A1 and in WO 2004/052558 A1 which is based on the latter, and in the survey article "Selective Plane Illumination Microscopy Techniques in Developmental Biology" by J. Huisken et al. published in 2009 in the journal *Development*, vol. 336, p. 63.

One of the chief applications of light sheet microscopy is for imaging intermediate-sized organisms having a size of some hundreds of micrometers to a few millimeters. Generally, these organisms are embedded in an agarose gel which is located in turn in a glass capillary. The glass capillary is inserted into a sample chamber filled with water, and the sample is pushed some distance out of the capillary. The sample in the agarose is then illuminated by a light sheet and the fluorescence is imaged on a camera by a detection objective oriented perpendicular to the light sheet and, therefore, also perpendicular to the optical axis of the illumination objective.

However, this method of light sheet microscopy has some drawbacks. For one, the samples to be examined are relatively large; they derive from developmental biology. Preparation of the samples in special cylindrical tubes which are filled with agarose gel is time-consuming and disrupts normal laboratory procedures; it is not compatible with standardized sample preparations or standardized sample holders. Further, the inevitable difference in refractive index between the cylindrical tubes of glass or plastic and the agarose gel leads to optical aberrations which can impair resolving power. Further, as a result of the sample preparation and the dimensions of the sample chamber, the light sheet is relatively thick and accordingly limits the attainable axial resolution.

In order to circumvent these limitations at least partially, a SPIM construction was recently developed in which the illumination objective and the detection objective are perpendicular to one another and are directed onto the sample from above at an angle of 45° in each instance. For example, when the plane of a specimen stage on which the sample vessel is supported or some other, usually horizontal, plane is used as reference surface, the illumination angle β and the detection angle δ are both 45°. A construction of this kind is described, for example, in WO 2012/110488 A2 and WO2012/122027 A2.

In constructions such as those described above, the sample is located, for example, on the bottom of a sample vessel designed as a petri dish. The petri dish is filled with water or nutrient solution, and the illumination objective and detection objective are immersed in the liquid. The water also takes on the function of an immersion liquid. This approach offers the advantage of higher resolution in axial direction, since a thinner light sheet can be generated. Smaller samples can then also be examined owing to the higher resolution. Sample preparation is also made easier but still does not correspond to the standard; nor are petri dishes used for the examination of individual cells in fluorescence microscopy. The petri dish must be relatively large so that the two objectives can be immersed in the dish without hitting the edge of the dish. Microtiter plates—also known as multi-well plates—which are standard in many branches of biology, and precisely also in fluorescence microscopy analysis of individual cells, cannot be used with this method because the objectives cannot be immersed in the very small wells that are arranged in grid shape on the plate. A further disadvantage consists in that it is not readily possible with this construction to analyze a large number of samples within a short period of time (high-throughput screening) because the objectives must be cleaned when changing samples in order to avoid contaminating the different samples. Further, in arrangements such as those known from the prior art, a relative displacement between the sample and the objective is required for changing the focal position. As a result of the corresponding movement, the components of the sample which are to be studied float up and, at worst, even completely leave the observation field.

One way to overcome these disadvantages is to maintain the configuration of β=δ=45° on one side, but to encapsulate the sample, including the surrounding medium, with respect to the environment. One possibility consists in directing the two objectives onto the sample not from above but rather in the manner of an inverted microscope from below, where illumination and detection take place through the transparent bottom of the sample vessel. This transparent vessel bottom—for example, of a petri dish or object carrier—together with the liquid layer or air layer located between the bottom and the objectives then forms the separating layer system. Detection can then continue from above in an equivalent manner provided the sample vessel is covered by a transparent cover or even without a cover of this kind, in which case the separating layer system comprises only an air layer to ensure the encapsulation. In this way, all typical sample vessels, for example, also microtiter plates, petri dishes and object carriers, can be used. In particular, a contamination of the samples can also be prevented in this way in case of high-throughput analysis.

However, this advantage comes at the cost of a further, grave disadvantage because as a result of using the separating layer system—for example, the coverslip or vessel bottom with adjoining air layer—extreme imaging aberrations such as spherical aberrations and coma occur even at low numerical apertures NA of, e.g., 0.3 because the light to be detected or the illumination light passes obliquely through the interfaces of the separating layer system and correct imaging is no longer possible when using standardized rotationally symmetrical objectives.

To overcome these disadvantages, it was suggested in DE 10 2013 107 297.6 to integrate corrective means in the form of corrective lenses or lens groups in the illumination objective and/or in the detection objective. Cylindrical lenses or lenses which are not arranged axially are among the corrective lenses suggested therein. The corrective lenses can also comprise elements with aspherical surfaces or free-form surfaces. Further, the materials used for the object carrier have approximately the refractive index of the medium in which the sample is located—for example, water or a nutrient solution—and, further, adaptive optical elements for manipulating the phase fronts of the illumination light and/or detection light are suggested for eliminating further aberrations. However, no concrete specifications are given as to how such corrective means can be designed. In addition, the proposed corrective lenses are only arranged in the objective behind the front lens, which makes it difficult to retrofit existing objectives.

SUMMARY OF THE INVENTION

It is the object of the invention, therefore, to eliminate the imaging errors occurring when illumination light and detection light pass obliquely through the object carrier, the bottom of the sample vessel or a coverslip by means of a corrective element which is as simple as possible and which advantageously also enables continued use of existing objectives. Further, preferably also spherical aberrations which can occur when focusing on different object planes are also compensated through corresponding corrective elements. Finally, the same objectives are preferably usable for a variety of combinations of sample vessel, coverslip and medium by means of the corrective elements.

The object upon which the invention is based is met in that the at least one detection corrective lens is configured as free-form lens which is arranged between the detection objective and the separating layer system. The at least one detection corrective lens can also form the front lens of the detection objective. In this case, an arrangement between the body of the already known objective and the separating layer system is possible, which in principle allows retrofitting at a relatively low expenditure apart from the shaping of the free-form lens. In this regard, it is also possible to apply a free-form surface to one or both sides of the existing front lens of the detection objective.

The free-form surface shape of the at least one detection corrective lens is described by an equation of the following form:

$$z = \frac{(x^2 + y^2)/R}{1 + \sqrt{1 - (1+k) \cdot \frac{(x^2 + y^2)}{R^2}}} + \sum_{m,n=1}^{\infty} C_{m,n} x^m y^n \quad (1a)$$

where k is the conic constant, R denotes the radius of an imaginary conic surface at the vertex of this surface, i.e., the distance from the vertex to the closest focal point. Both the vertex and the focal points of the conic surface lie on the optical axis.

Coordinates x and y describe a point on the lens surface in a coordinate system with the optical axis along the z direction. Accordingly, $x^2+y^2$ denotes the distance of the point from the optical axis. The function $z(x, y)$ denotes the distance of the lens surface from a plane perpendicular to the optical axis at the vertex of the conic surface in the coordinate pair (x, y); $c_{m,n}$ is the coefficient of a polynomial in x and y. The coefficient $c_{m,n}$, the conic constant k and radius R are determined by iteration, where only those coefficients having an even power in the x coordinate are not equal to zero. The z axis denotes the primary optical axis of the objective.

In this regard, it has been shown that the best position for the correction of the imaging defects brought about by the oblique passage through the separating layer system lies in the front portion of the detection objective or in front of the detection objective. In particular, one or two free-form surfaces of the type mentioned above can also be applied to the first lens of the detection objective situated on the object side. The leading artifacts generated by the obliquely traversed separating layer system are rotationally symmetrical artifacts such as defocusing and spherical aberrations. However, these aberrations can usually be corrected through the customary rotationally symmetrical lenses in the objective or through the air spaces thereof. Further, axial coma and axial astigmatism as well as higher-order artifacts also occur, although they cannot be corrected through the steps described above. However, they can be practically completely corrected through an individual free-form lens when both the front side of the lens and back side of the lens are formed by suitably selected free-form surfaces. The z axis is the primary optical axis of the objective, i.e., the optical axis of the rotationally symmetrical lenses of the objective without the free-form elements, because, strictly speaking, the objective with the asymmetrical free-form surfaces no longer has an optical axis.

In a preferred embodiment, the detection objective further has a detection focusing device for internal focusing and for simultaneous correction of spherical aberrations occurring during change of focus. The spherical aberrations which can very severely impair the image quality of the objective particularly in objectives of high numerical aperture can be corrected in this way. Accordingly, a high diffraction-limited image quality can be obtained over the entire adjustment range. Further, due to the fact that the detection focusing device is designed for internal focusing, a relative displacement of the sample and the objective can be avoided, which facilitates the construction of the entire arrangement for light sheet microscopy, since the objective and stage or sample vessel need no longer be displaced relative to one another. In this connection, the numerical aperture of the detection objective is preferably at least 0.8, particularly preferably at least 1.0. A detection focusing device of this type in the detection objective makes it possible to image any plane within an object-side sample volume of at least 100 µm×100 µm×100 µm in a diffraction-limited manner.

In a further, particularly preferred embodiment, the detection focusing device includes at least a first adaptive optical detection focusing element which is arranged in, or can be inserted into, the beam path for internal focusing and simultaneous correction of spherical aberrations occurring during a change of focus insofar as these spherical aberrations are not yet corrected through the lenses and the arrangement thereof in the objective itself or by way of supplementing this basic correction.

While the detection corrective lens completely corrects the aberrations for a specific configuration of medium, separating layer material and separating layer thickness, the adaptive optical detection focusing element serves to adapt to other focal positions. The detection corrective lens is configured in such a way that it compensates for the effect of the coverslip arranged obliquely with respect to the optical axis of the objective so that rotationally symmetrical conditions approximately prevail again behind this lens. The adaptive optical detection focusing element need only compensate for the defocusing and the spherical aberrations which play a role in focusing on other sample depths.

In a further preferred embodiment, the detection objective has a first detection lens group downstream of the detection corrective lens which images an object-side image field to infinity; further, the detection objective has a second detection lens group which is preferably constructed to be afocal. In this regard, the first adaptive optical element is arranged between the first detection lens group and the second detection lens group. The aperture diaphragm of the system is preferably located behind the first detection lens group and is then imaged to infinity by the first detection lens group so that an approximately telecentric beam path is realized on the object side. Further, the adaptive optical detection focusing element is arranged in the approximately collimated beam path behind the first detection lens group. The second detection lens group is constructed so as to be substantially afocal and, together with the first detection lens group, forms the basic microscope objective.

As with the detection objective, an illumination corrective lens system can also be realized with at least one illumination corrective lens with the same effect as the detection corrective lens. The illumination corrective lens is also designed as a free-form lens. And with the illumination corrective lens as with the detection corrective lens, not only can one side be designed as a free-form surface, but both sides of the lens can also be designed as free-form surfaces. Also, an illumination focusing device for internal focusing is preferably arranged in the illumination objective, as well as at least one adaptive optical illumination focusing element having the same function as the at least one adaptive optical detection focusing element in the detection objective. The numerical aperture of the illumination objective is substantially smaller than that of the detection objective and is generally no higher than NA=0.5. Therefore, the requirements for wavefront quality in the illumination objective are not as high as in the detection objective, which lowers the requirements for the corrective elements.

In a particularly preferred construction, the at least one adaptive optical detection focusing element and the at least one adaptive optical illumination focusing element are formed, respectively, as wavefront manipulators. Each of the wavefront manipulators preferably comprises two free-form surfaces which are movable opposite one another lateral to the optical axis. A wavefront manipulator of this type is described, for example, in DE 10 2012 101 262 B3, the disclosure of which is explicitly incorporated herein in its entirety and is referred to in particular with respect to various possible embodiments for a wavefront manipulator.

While the above-mentioned formula (1a) is applied for free-form surfaces on lenses, the free-form surfaces of the wavefront manipulator can be represented purely as polynomial expansion, since there is no basic curvature to be taken into account in this case. Explicitly, the following formula can be used to determine the two free-form surfaces, both of which are usually identical:

$$z = \sum_{m,n=1}^{\infty} C_{m,n} x^m y^n \quad (1b)$$

In this regard, only those polynomial terms in n and m which have an odd power of coordinates (either x or y) which are parallel to the displacement direction and an even power of the coordinates (either y or x) which are perpendicular to the displacement direction are not equal to zero. Without limiting generality, it will be assumed in the following that the displacement direction corresponds to the y axis.

In the simplest embodiment form, the wavefront manipulator comprises exactly two free-form elements which are displaced transverse to the optical system axis: the one element is displaced by distance s along the positive y direction, and the other is displaced simultaneously in the opposite direction by distance s in the negative y direction. Accordingly, the two free-form elements are displaced relative to one another in exactly opposite directions and by the same amounts. In the simplest case, the two free-form elements are formed of a plane side and a free-form surface. The two free-form surfaces of the elements of the wavefront manipulator are generally identical so that the two free-form elements supplement one another in a complementary manner in a zero position exactly so as to form a plane-parallel plate. It is possible to deviate from this so as to take into account non-paraxial effects.

The profile function of the free-form elements can be described by a function which is given in the direction parallel to the displacement direction of the elements by an antiderivative—the first integral—of the required wavefront change and in the direction perpendicular thereto by a function which is proportional to the required effect of the wavefront change.

A pure defocusing effect can be achieved, for example, when the free-form surface is described by a third-order polynomial:

$$z(x, y) = k \cdot \left( x^2 \cdot y + \frac{y^3}{3} \right) \quad (2)$$

where it is assumed that the lateral displacement of the elements takes place along the y axis. The parameter k scales the profile depth and, in this way, fixes the achievable change in refractive power per unit of the lateral displacement path s.

A wavefront manipulator for generating primary spherical aberration can be described, for example, by the following profile function:

$$z(x, y) = k \cdot \left( y \cdot x^4 + \frac{2}{3} \cdot (x^2 \cdot y^3) + \frac{y^5}{5} \right) \quad (3)$$

The free-form elements can also be designed to influence other higher-order wavefront errors. A plurality of wavefront manipulators of different types can also be coupled one behind the other in order to successively limit different errors. For further details, reference is made to the above-cited DE 10 2012 101 262 B3.

In a preferred embodiment of a wavefront manipulator, an immersion medium is introduced between the free-form surfaces of the wavefront manipulator which are movable opposite one another. In this way, it is possible to adjust a predetermined wavelength dependency of the wavefront change through the manipulator, particularly, for example, an achromatic effect. For details relating to the adaptation of an immersion medium between free-form elements, reference is made again to DE 10 2012 101 262 B3, the disclosure of which is incorporated herein in its entirety.

If an immersion medium is introduced between the free-form surfaces of the wavefront manipulator which are movable opposite one another, the free-form elements which can be moved relative to one another are sealed in a liquid-tight manner, for example, by means of a sleeve made of elastic plastic sheeting, a bellows construction or the like.

The optical elements at which the free-form surfaces of the wavefront manipulator are formed are preferably fabricated from a material with anomalous partial dispersion. In addition or alternatively, the immersion medium, if present, has a dispersion curve which deviates from the normal line. Accordingly, the free-form elements can be formed of media having a deviation of the refractive index dispersion from the normal line. Such materials include, for example, long crown glass or short flint glass. Secondary chromatic aberrations can be selectively adjusted or corrected in this way. Normally, secondary chromatic aberrations of this type can only be corrected even through a plurality of lenses when at least one of these lenses is formed from a glass of this type with anomalous partial dispersion. However, glasses of this kind have numerous disadvantages and unwanted characteristics. In particular, they are comparatively expensive and difficult to machine, since they are very chemically sensitive to alkaline or acidic grinding agents and polishing agents. In contrast, the free-form elements can be formed in this case from inexpensive, acid-resistant standard glasses, while an organic hydrocarbon which has a deviation in dispersion behavior from the normal line and is therefore suitable for correcting secondary chromatic aberrations is used as immersion medium between the free-form elements. Accordingly, by means of the wavefront manipulator, a correction of the secondary spectrum can be achieved by alternative methods only with normal glasses, i.e., glasses lying on the normal lines in the Abbe diagram.

As has already been mentioned, the second detection lens group of the detection objective which is arranged on the side of the wavefront manipulator facing the observer is preferably constructed so as to be afocal so that different basic objectives and different microscope tube systems can be freely combined with one another. This is known as an "infinity interface". In this case, a third detection lens group is preferably arranged behind the second lens group, i.e., on the side of this second detection lens group remote of the object, when the second detection lens group is constructed in an afocal manner. The third detection lens group is formed as a tube lens group. All three lens groups together generate a real intermediate image which can either be viewed in a visually magnified manner or captured by a corresponding detection device such as a digital camera.

Preferably, the first detection lens group, the detection corrective lens and the at least one layer of the separating layer system form an optical system which approximately meets the following condition:

$$h_1 = f_{FG} \cdot \sin \sigma_0 = n_0 \cdot f_{FG}' \cdot \sin \sigma_0 \quad (4)$$

Deviations of up to 10% from this condition are permissible and tolerable. In the equation, $h_1$ is the incident height of the opening beam at the wavefront manipulator, $\sigma_0$ is the angle of inclination of the edge beam relative to the optical axis, $f_{FG}=-n_0*f'_{FG}$ is the front object-side focal length of the front lens group, and $n_0$ is the refractive index of the immersion medium between object and front lens. This condition can be met, for example, by a front lens group which is formed solely from spherical lenses except for the free-form lens for correcting the oblique passage of the beam through the separating layer system. However, the condition can be met in a particularly simple and exact manner when the first detection lens group comprises a rotationally aspherical lens in the vicinity of the above-mentioned aperture diaphragm. The use of at least one rotationally symmetrical aspherical lens is particularly advantageous in objectives having very high apertures or large aperture angles and then not only assists in the correction of the customary opening errors, i.e., the spherical aberrations, but also in complying with the sine condition of the front lens group in equation 4. While this sine condition is usually met for an entire microscope objective, since otherwise a sharp imaging in an expanded image field would not be possible, individual sub-groups of an objective need not necessarily meet this condition.

The preceding remarks particularly in connection with the design of the detection objective can also be applied to the illumination objective. In order to generate an exactly defined light sheet, for example, a Bessel beam, a corrected basic objective is also needed to begin with, which basic objective contains a corresponding phase mask, such as is known from the prior art, in the vicinity of a pupil plane. The aberrations in the illumination objective due to the light beams passing obliquely through the separating layer system must also be compensated, which can be carried out according to the invention through a free-form corrective lens as illumination corrective lens as has already been described in connection with the detection objective. Further, in a manner analogous to the displacement of the focal plane or object plane, the light sheet is to be shifted along the normal-line direction or primary optical axis of the illumination objective or along the normal-line direction of the limiting plate to a greater or lesser depth into the sample. This can be realized, for example, solely through a wavefront manipulator comprising moving free-form elements. However, it is also conceivable that another optical means for refocusing on another focal depth, for example, a zoom lens of elastopolymer or the like, is used in the illumination optics having lower requirements with respect to correction. With a small illumination aperture, a very conventional solution such as displacing the illumination objective in its entirety can also be effective.

Alternatively or in addition, the detection objective or the illumination objective can be outfitted on the one hand with a free-form lens for compensating the oblique passage of light through the separating layer system and on the other hand can have a conventional mechanism for internal focusing and a conventional mechanism for the above-mentioned correcting functions in connection with different immersion media or coverslip thicknesses and coverslip materials. In this case, a conventional mechanism can be, for example, the axial displacement of lenses or lens groups or changing the air spaces between the lenses. To achieve the greatest possible variation, it can be advantageous in particular to carry out some of the adaptations through a wavefront manipulator and the other adaptations through axial lens displacements.

The function of the detection corrective lens and illumination corrective lens, respectively, can be assumed by a lens which is already contained in the system—particularly in the objective—and which then preferably has a high basic refractive power. The corresponding free-form profiles are then added to the spherical or rotationally aspherical active surfaces of this lens. But the function of the corrective lens can also be achieved by adding a separate, additional lens having substantially no refractive power. This can have the advantage that the requirements for aligning the element in the beam path are less critical so that the system can be produced and aligned more easily.

Further, the correcting action can also be allocated to a plurality of lenses, in which case the free-form surfaces of these lenses need not deviate as much from a spherical shape and can possibly be produced in a simpler manner. It is also possible to simplify the shape of the corrective lens for manufacture in that a prismatic component of the element is split off and constituted by a separate wedge with plane surfaces. However, particularly for purposes of simplified alignment, the preferred means comprise a detection corrective lens or illumination corrective lens which is bounded by free-form surfaces on both sides.

It will be appreciated that the features mentioned above and those to be described hereinafter can be used not only in the indicated combinations but also in other combinations or individually without departing from the scope of the present invention.

BRIEF DESCRIPTION OF THE DRAWINGS

FIG. 4 a-c shows a further embodiment of a detection objective with various settings of a wavefront manipulator.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

While the examples described in the following refer explicitly to a detection objective, they can also be readily applied to an illumination objective.

Figure 1:
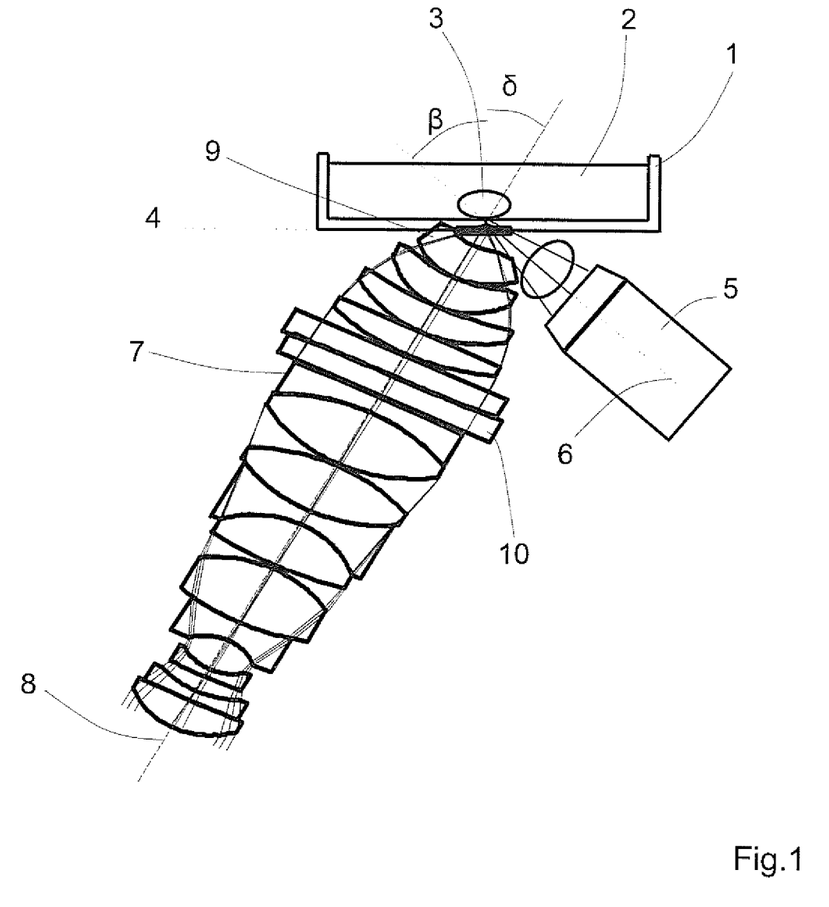
FIG. 1 shows the basic construction of an arrangement for light sheet microscopy.

First, FIG. 1 shows the basic construction of an arrangement for light sheet microscopy. This arrangement comprises a sample vessel 1 for receiving a sample located in a medium 2. The sample vessel 1 is aligned with respect to a plane reference surface 4. The arrangement further comprises illumination optics with an illumination objective 5 for illuminating the sample 3 with a light sheet via an illumination beam path. The optical axis—more precisely, the primary optical axis—6 of the illumination objective 5 and the light sheet lie in a plane which forms an illumination angle β not equal to zero with the normal lines of the reference surface 4. The arrangement further comprises detection optics with a detection objective 7 in a detection beam path having an optical axis 8 which forms a detection angle δ not equal to zero with the normal lines of the reference surface 4. The arrangement further comprises a separating layer system with at least one layer made of a predetermined material with predetermined thickness which separates the medium 2 from the illumination objective 5 and the detection objective 7. The separating layer system is formed so as to contact the medium 2 by a base surface which is aligned parallel to the reference surface 4 at least in the region which is accessible to the illumination objective 5 and the detection objective 7 for illuminating and detecting.

In the present example, the sample vessel 1 is formed as a petri dish which opens upward and is filled with the medium 2. To prevent contamination, the illumination objective 5 and the detection objective 7 can either be arranged above the sample vessel 1—in this case, the separating layer system forms only the air layer between the upper surface of the medium 2 and the objectives—or, as is shown in FIG. 1, below the sample vessel 1. In this case, the separating layer system is formed on the one hand from the layer between the sample vessel and the objective but, on the other hand, by the transparent bottom of the sample vessel 1 which is fabricated from a material with a refractive index not equal to 1.0. Since detection objective 7 and illumination objective 5 are slanted with respect to the reference surface 4 and particularly with respect to the bottom of the sample vessel 1, severe aberrations occur when light is directed from the illumination objective 5, behind which is located a light source, not shown, through the separating layer system to the sample 3 and light emitted from the sample 3—for example, scattered, reflected or fluorescence-excited light—likewise passes obliquely through the separating layer system in direction of the detection objective 7. In order to eliminate these aberrations, the arrangement for light sheet microscopy comprises a detection corrective lens system with at least one detection corrective lens 9 for reducing those aberrations occurring as a result of the oblique passage of light to be detected through the interfaces of the separating layer system. The layer between the bottom and the objective can be air, for example. Owing to the large variations in the refractive index between the media, the rotationally asymmetrical aberrations to be corrected are relatively large—compared with the use of media with similar refractive indices—in which case implementing numerical apertures between 0.8 and 1.0 is technically very uneconomical. Therefore, there is preferably an immersion medium, for example, water, between the bottom of the petri dish and the objectives. If the medium 2 is separated from the immersion medium by the bottom or by a corresponding coverslip when observed from above, other immersion media can also be used, for example, immersion media hostile to biological samples. When the materials selected for the medium 2, coverslip and immersion medium between the coverslip and objective have similar refractive indices, corrections can be made in a simpler manner with free-form surfaces even for large numerical apertures.

The illumination objective 5 is only indicated schematically, but generally also comprises a plurality of lenses. In the present example, the angle δ of the primary optical axis 8 of the detection beam path to the normal lines of the reference surface 4 is 26°, the opening angle with a numerical aperture in water is ±40.55°. The angle β of the illumination beam path to the normal lines of the limiting surface is 64° with a typical opening angle of 22° with a numerical aperture NA of 0.5. The thickness of the vessel bottom of the sample vessel 1 typically ranges between 0.17 mm and 0.50 mm, but can deviate from this.

In the example shown in FIG. 1, the detection corrective lens system comprises exactly one detection corrective lens 9 which is designed as a free-form lens and, in this case, forms the front lens of the detection objective 7. However, it can also be constructed as a separate optical element and be arranged between the detection objective 7 and the separating layer system. It is also possible, in principle, to arrange it inside the objective, in which case it may possibly be sufficient to provide the surface of an individual lens with a free-form surface. The detection objective 7 preferably has a detection focusing device for internal focusing with simultaneous correction of spherical aberrations which can occur during a change in focus. The numerical aperture of the detection objective 7 is preferably 0.8 or more.

In addition to the detection corrective lens 9, the detection objective 7 here further comprises in the beam path, for example, at least one optional adaptive optical detection focusing element for internal focusing of the detection objective 7 with simultaneous correction of spherical aberrations occurring during a change in focus. The illumination objective 5 can also be designed in the same way. In this case, the adaptive optical element is configured as a wavefront manipulator 10 as has been described, for example, in DE 10 2012 101 262 B3, the disclosure of which is again referred to explicitly and which is incorporated herein in its entirety. It is also possible to configure the focusing elements in the detection objective and illumination objective in such a way that they serve only for internal focusing and the corrections of the spherical aberrations occurring during a change in focus are carried out already by means of the rest of the lenses of the objectives.

Figure 2A:
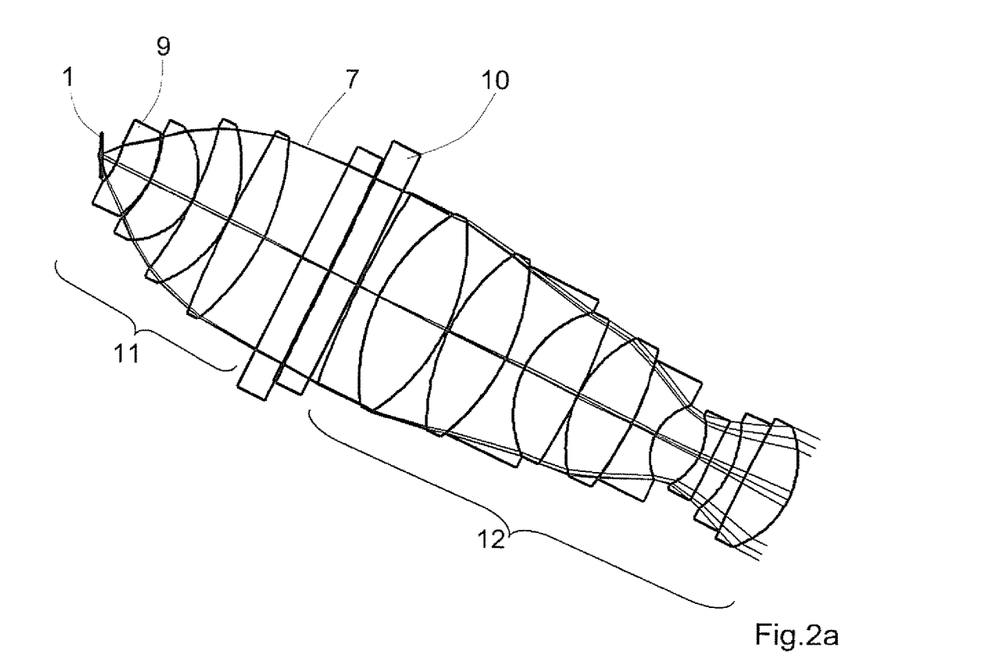
FIGS. 2a-2c show a general view of a first construction of a detection objective with various settings of a wavefront manipulator.
Figure 2B:
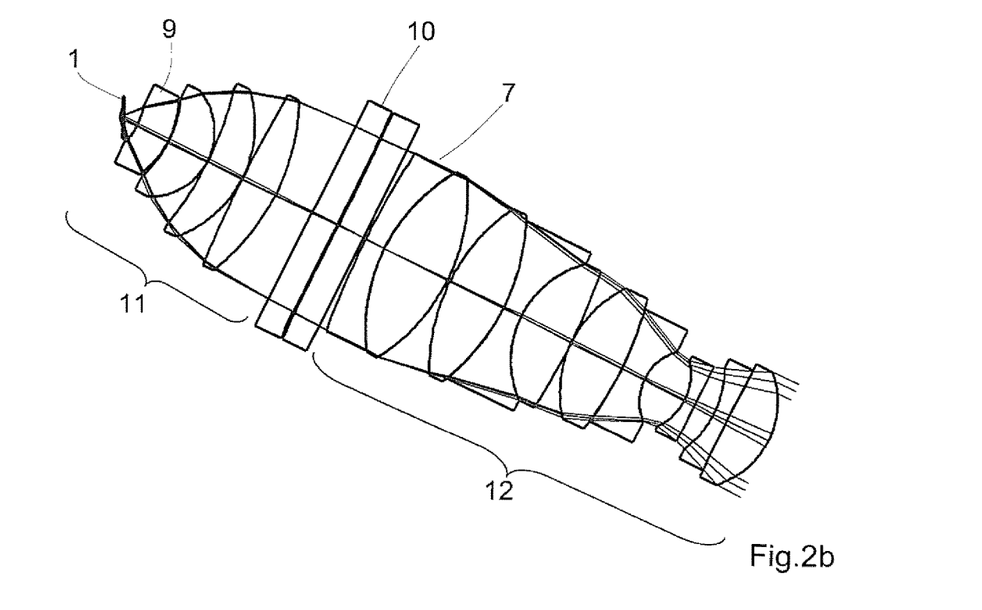
Figure 2C:
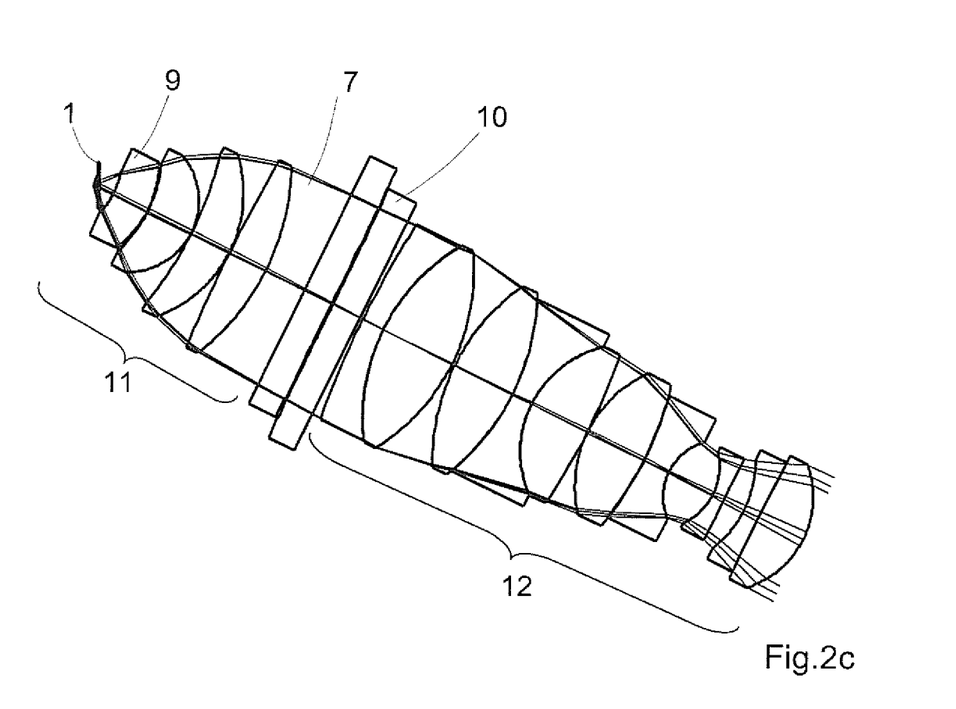
Figure 3A:
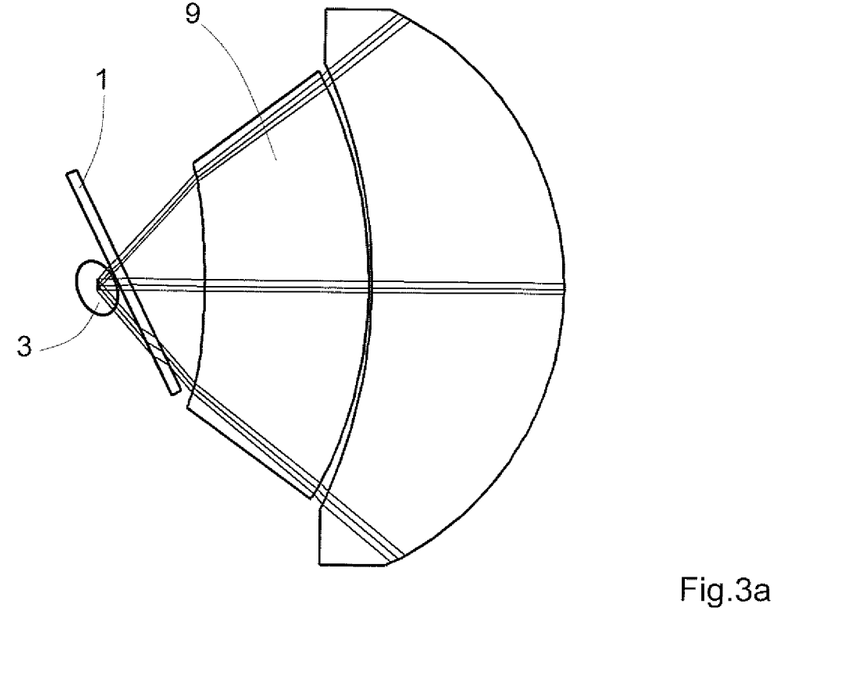
FIGS. 3a-3c shows the beam path in the region of the detection corrective lens in detail for the configurations shown in FIGS. 2a-2c.
Figure 3B:
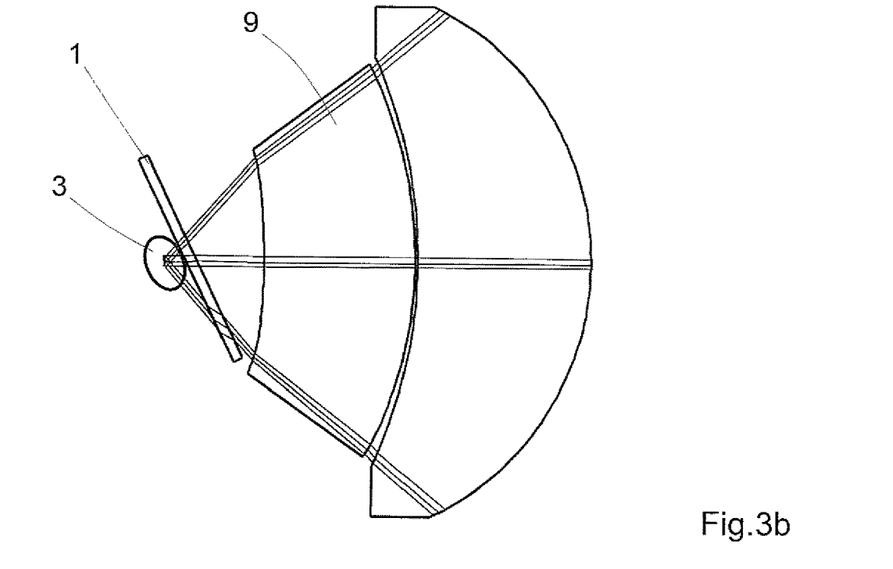
Figure 3C:
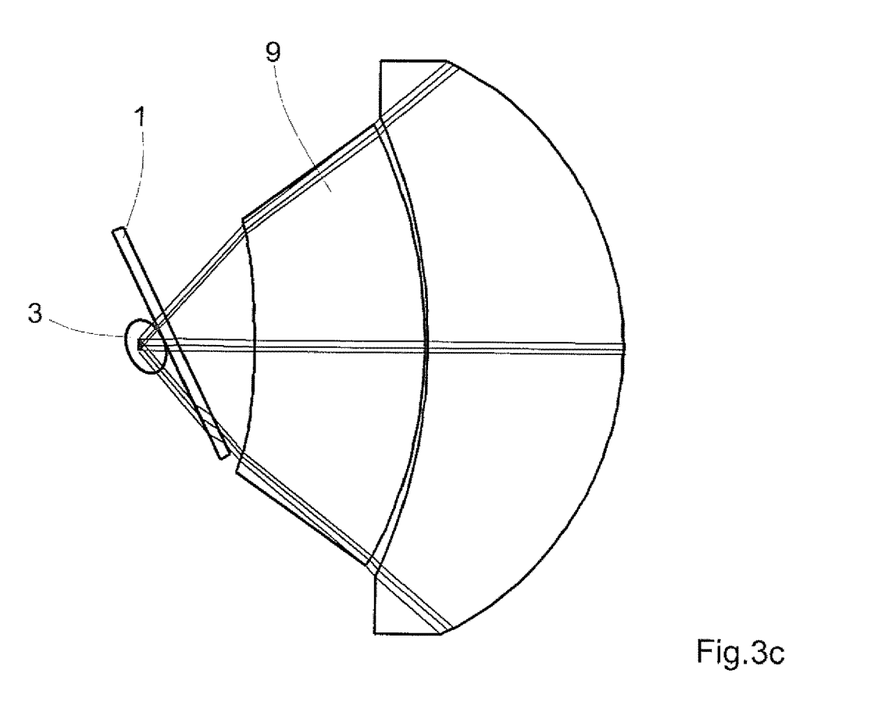

A first embodiment of a detection objective 7 which is part of the arrangement for light sheet microscopy is described in more detail referring to FIGS. 2a-2c and 3a-3c. Analogous considerations and adjustments can also be made for the illumination objective 5. In the detection objective 7 shown in FIGS. 2a-2c, an adaptive optical detection focusing element designed as a wavefront manipulator 10 is arranged in the beam path. FIGS. 2a, 2b and 2c show the same objective in each instance but with different settings of the wavefront manipulator 10 resulting in different beam paths. FIGS. 3a, 3b and 3c show corresponding sections in the front lens region which correspond to the respective setting of the wavefront manipulator 10. The different focal planes are shown particularly clearly.

Detection takes place through a standardized coverslip with a thickness of 0.17 mm. The detection objective 7 has a numerical aperture NA of 1.0 and a 40-fold magnification. The immersion medium is water, that is, instead of a separating layer system of coverslip and air, a separating layer system of coverslip and water is used here. The detection objective 7 comprises exactly one detection corrective lens 9 which is configured as a free-form lens. It compensates for the influence of a coverslip which is traversed obliquely at 26°. The wavefront manipulator 10 comprises two free-form elements which are movable transverse to one another and which are suitable for refocusing inside a sample depth of ±50 μm at an average wavelength of 500 nm. The objective has an object-side image field of 200 μm diameter.

FIGS. 2a-2c show a meridional section through the detection objective 7. In FIG. 2a and correspondingly in FIG. 3a, the wavefront manipulator 10 is in a position which shortens the object-side focal position, i.e., the focal distance, by 50 μm. The middle, neutral setting of the wavefront manipulator 10 is shown in FIG. 2b and correspondingly in FIG. 3b, and the setting in which the focal position is 50-μm deeper in the sample space is shown in FIG. 2c and correspondingly in FIG. 3c. On the whole, the distance of the focused plane in the sample space from the coverslip or bottom of the sample vessel 1 varies within a range of between 0.35 mm and 0.45 mm. The displacement of the respective object-side focal position can be seen even more clearly in the enlarged sections in FIGS. 3a to 3c.

In detection objective 7, the imaging quality is diffraction-limited over the entire defocusing range. Except for the detection corrective lens 9 and wavefront manipulator 10, the detection objective 7 has exclusively spherical lenses whose surfaces can be described by the conventional vertex form of the sphere equation:

$$z = \frac{(x^2 + y^2)/R}{1 + \sqrt{1 - (1+k) \cdot \frac{(x^2 + y^2)}{R^2}}} \quad (5)$$

The detection corrective lens 9 for correcting the coverslip through which the beam bundles pass obliquely has a free-form surface on the front as well as on the back. Both free-form surfaces can be described corresponding to equation (1a) as a superposition of a spherical base surface and a polynomial expansion. The free-form surfaces of the wavefront manipulator can be described through equation (1b). The detection corrective lens 9 in this case forms the front lens of the detection objective 7 and virtually completely compensates for the influence of the coverslip that is traversed obliquely by the light to be detected. The z-axis corresponds to the primary optical axis of the detection objective 7, the x axis is perpendicular to the sheet plane in FIG. 1 and in the rest of the figures.

The optical design data for the detection objective 7 shown in FIGS. 2a-2c, 3a-3c are listed in the following table. All of the optical elements are constructed as refractive glass elements.

TABLE 1

Objective data for the first embodiment example (FIGS. 2a-c, FIGS. 3a-c)

| No. | Radius (y) | Thickness/ Space | Glass type/ Medium | Half-diameter | Non-centered data |
|---|---|---|---|---|---|
| Object | ∞ | 0.3500 | 'W23' | | |
| 1 | ∞ | 0.0000 | 'W23' | 1.5 | Basic Decenter |
| 2 | ∞ | 0.1700 | K5 | 1.5 | |
| 3 | ∞ | 0.0000 | 'W23' | 1.8 | |
| 4 | ∞ | 1.2000 | 'W23' | 0.8 | Basic Decenter |
| 5 | −3.1758 | 2.7136 | SLAH58 | 1.9 | Decenter & Return |
| 6 | −6.8472 | 0.0500 | | 3.5 | Decenter & Return |
| 7 | −8.6858 | 3.1340 | SFPL53 | 3.6 | |
| 8 | −5.0455 | 0.0200 | | 4.6 | |
| 9 | −19.3329 | 2.6253 | SFPL53 | 5.6 | |
| 10 | −8.7858 | 0.0200 | | 6.1 | |
| 11 | 178.6613 | 2.6274 | SFPL53 | 6.8 | |
| 12 | −15.7993 | 1.4251 | | 7.0 | |
| 13 | ∞ | 0.0000 | | 7.8 | Basic Decenter |
| 14 | ∞ | 2.0000 | NLASF44 | 7.8 | |
| 15 | ∞ | 0.0000 | | 7.8 | |
| 16 | ∞ | 0.0000 | | 7.2 | Basic Decenter |
| Diaphragm | ∞ | 0.1000 | | 7.0 | |
| 18 | ∞ | 0.0000 | | 7.8 | Basic Decenter |
| 19 | ∞ | 2.0000 | NLASF44 | 7.8 | |
| 20 | ∞ | 0.0000 | | 7.9 | |
| 21 | ∞ | 0.0000 | | 7.2 | Basic Decenter |
| 22 | ∞ | 0.2000 | | 7.2 | |
| 23 | 120.1456 | 1.5000 | NKZF511 | 7.3 | |

TABLE 1-continued

Objective data for the first embodiment example (FIGS. 2a-c, FIGS. 3a-c)

| No. | Radius (y) | Thickness/ Space | Glass type/ Medium | Half-diameter | Non-centered data |
|---|---|---|---|---|---|
| 24 | 14.7553 | 5.0755 | SFPL53 | 7.3 | |
| 25 | −13.4480 | 0.2000 | | 7.4 | |
| 26 | 13.3186 | 4.5436 | SFPL53 | 6.8 | |
| 27 | −14.9847 | 1.4000 | NKZF511 | 6.4 | |
| 28 | 7.2474 | 4.1147 | SFPL53 | 5.6 | |
| 29 | −50.8349 | 1.0937 | | 5.5 | |
| 30 | 8.0673 | 3.6755 | SNBH53 | 5.2 | |
| 31 | 36.1929 | 2.3966 | NKZFS2 | 4.6 | |
| 32 | 36.924 | 3.0423 | | 2.8 | |
| 33 | −4.0923 | 0.8000 | NKZF54 | 2.7 | |
| 34 | −6782.3949 | 1.5151 | | 3.0 | |
| 35 | −7.5088 | 1.0000 | NKZF58 | 3.3 | |
| 36 | 272.5054 | 2.9577 | NLAK8 | 4.1 | |
| 37 | −6.0684 | 0.0200 | | 4.5 | |
| 38 | ∞ | 126.5000 | | 4.5 | |
| 39 | 189.4170 | 10.9000 | NBALF4 | 7.8 | |
| 40 | −189.4170 | 60.0000 | | 7.8 | |
| 41 | ∞ | 80.0000 | | 6.4 | |
| 42 | ∞ | 48.2000 | NBK7 | 5.3 | |
| Image | ∞ | 0.0000 | | 4.3 | |

The y radius in Table 1 is the vertex radius in the y-z plane. The half-diameter denotes the free half-diameter, i.e., half of the required diameter of the surface through which all of the beam bundles can pass through the optical system without vignetting, and is given in mm.

The surfaces are numbered consecutively proceeding from the object side; the numbers are indicated in the left-hand column. The sample is in a physiologic saline solution designated by "W23"; this saline solution is likewise located between the coverslip and the objective. The object-side surface of the coverslip is surface number 2. An aperture diaphragm, not shown, is located between lens surface 16 and lens surface 18; the object-side surface number of the detection corrective lens 9 is 5, and the surface number remote of the object is 6. The free-form surfaces of the wavefront manipulator 10 are numbered 15 and 19. When a value of "∞" is given as radius, the spherical surfaces are in each instance plane surfaces; in the case of an aspherical surface, the radius of the imaginary conic surface at the vertex is R=0. As with the y radius, thickness is given in mm. With the exception of free-form surfaces 5, 6, 15 and 19, all of the surfaces are spherical or plane. The data in the final column refer to the type of decentering; the decentering data for the free-form surfaces ADE, BDE, CDE, XDE, YDE, ZDE are indicated in a different place in Table 3. "Basic decenter" means that the coordinate system that is used for determining coefficients, etc. is rotated and tilted by decentering specifications for the current surfaces and all of the following surfaces. "Decenter and return" means that the decentering is only valid for the current surface, and for the next surface the previous surface is restored. The order is fixed in accordance with the numbering of the surfaces. The refractive indices of the optical media of the wavelengths considered for the configuration are indicated for some selected wavelengths in Table 2. In the case of the decentering data for surface 1 in Table 1, ADE=26.00, and all of the other values are zero. In case of surface 4 in Table 1, ADE=−26.00 and YDE=−0.0788, all of the other values are zero.

TABLE 2

Types of glass used in the objectives

| Glass type/ medium | λ[nm] | | | | | | |
|---|---|---|---|---|---|---|---|
| | 850.0 | 643.85 | 546.07 | 479.99 | 435.83 | 404.00 | 365.00 |
| 'W23' | 1.3268 | 1.3311 | 1.3341 | 1.3371 | 1.3399 | 1.3425 | 1.3467 |
| K5 | 1.5151 | 1.5202 | 1.5245 | 1.5290 | 1.5333 | 1.5374 | 1.5441 |
| SLAH58 | 1.8658 | 1.8775 | 1.8881 | 1.8994 | 1.9104 | 1.9211 | 1.9391 |
| SFPL53 | 1.4348 | 1.4375 | 1.4398 | 1.4422 | 1.4444 | 1.4464 | 1.4498 |
| NLASF44 | 1.7901 | 1.7998 | 1.8083 | 1.8173 | 1.8259 | 1.8342 | 1.8481 |
| NKZFS11 | 1.6254 | 1.6339 | 1.6413 | 1.6491 | 1.6567 | 1.6640 | 1.6763 |
| SNBH53 | 1.7202 | 1.7323 | 1.7434 | 1.7555 | 1.7676 | 1.7798 | 1.8012 |
| NKZFS2 | 1.5494 | 1.5557 | 1.5608 | 1.5661 | 1.5711 | 1.5759 | 1.5838 |
| NKZFS4 | 1.6020 | 1.6098 | 1.6166 | 1.6238 | 1.6307 | 1.6373 | 1.6486 |
| NBALF4 | 1.5706 | 1.5768 | 1.5821 | 1.5876 | 1.5930 | 1.5981 | 1.6065 |
| NBK7 | 1.5098 | 1.5147 | 1.5187 | 1.5228 | 1.5266 | 1.5303 | 1.5362 |
| NKZFS8 | 1.7042 | 1.7153 | 1.7253 | 1.7363 | 1.7472 | 1.7580 | 1.7769 |
| NKLAK8 | 1.7018 | 1.7096 | 1.7161 | 1.7229 | 1.7294 | 1.7355 | 1.7457 |

The polynomial coefficients of the front free-form surfaces of free-form lens which face the object with the number 5 are:

TABLE 3

Polynomial coefficients, front free-form surface of the detection corrective lens 9

| Y: | −1.4627E−02 | X2: | 1.2761E−01 | Y2: | 1.2671E−01 |
|---|---|---|---|---|---|
| X2Y: | 1.2631E−03 | Y3: | 2.0508E−03 | X4: | −2.2250E−03 |
| X2Y2: | −4.8626E−03 | Y4: | −2.8374E−03 | X4Y: | 2.5817E−04 |
| X2Y3: | 6.8766E−04 | Y5: | 5.0231E−04 | X6: | 2.4021E−04 |
| X4Y2: | 6.8499E−04 | X2Y4: | 5.9973E−04 | Y6: | 1.4423E−04 |
| XDE: | 0.000000 | YDE: | 0.000000 | ZDE: | 0.000000 |
| ADE: | −0.691247 | BDE: | 0.000000 | CDE: | 0.000000 |

By "X2Y3" is meant coefficients $C_{2,3}$, i.e., m=2, n=3, etc. "Y" denotes n=1 and m=0. "XDE, . . . , CDE" refer to the decentering of the coordinate system and mean that the local coordinate system in which the corresponding surface is described by its sagittal height formulas—equation (1a) or (1b)—is rotated relative to the global coordinate system by an angle ADE around the local x axis, by an angle BDE around the local y axis and by an angle CDE around the local z axis. A positive sign denotes a counterclockwise rotation, and a negative sign denotes a rotation in clockwise direction around the respective local axis.

The polynomial coefficients of the rear free-form surface of the detection corrective lens 9 are given in Table 4:

TABLE 4

Polynomial coefficients, rear free-form surface of the detection corrective lens 9

| Y: | −2.7790E−02 | X2: | 7.5549E−03 | Y2: | 6.9247E−03 |
|---|---|---|---|---|---|
| X2Y: | −2.7842E−05 | Y3: | 6.4922E−05 | X4: | 1.2461E−04 |
| X2Y2: | 2.1053E−04 | Y4: | 7.7032E−05 | X4Y: | 1.4567E−05 |
| X2Y3: | 3.9465E−05 | Y5: | 2.6627E−05 | X6: | −7.3228E−06 |
| X4Y2: | −2.3699E−05 | X2Y4: | −2.6746E−05 | Y6: | 1.0446E−05 |
| XDE: | 0.000000 | YDE: | 0.000000 | ZDE: | 0.000000 |
| ADE: | −0.691247 | BDE: | 0.000000 | CDE: | 0.000000 |

Finally, the polynomial coefficients of the two free-form surfaces of the wavefront manipulator 10 with surface numbers 15 and 19 are described in Table 5:

TABLE 5

Polynomial coefficients of the free-form surfaces of the wavefront manipulator

| X2Y: | −2.7842E−05 | Y3: | −1.3950E−04 | X4Y: | −7.1487E−09 |
|---|---|---|---|---|---|
| X2Y3: | 3.9465E−05 | Y5: | −1.4910E−08 | X6Y: | 6.2211E−09 |
| X4Y3: | −2.3699E−05 | X2Y5: | 3.5843E−09 | Y7: | 8.4412E10 |

The lateral movement range of the two free-form elements of the wavefront manipulator 10 is 0.67 mm in each instance, and these two elements always move exactly opposite one another along the y-coordinate direction of the system. While the free-form elements move laterally in the range of ±0.67 mm, i.e., carry out a relative movement of about 1.4 mm with respect to one another, the object-side focal point moves by ±50 μm in longitudinal direction along the z axis. The focal plane moves deeper into the sample between FIGS. 3a and 3c so that the distance from the coverslip increases from 0.35 mm to 0.45 mm.

Figure 4A:
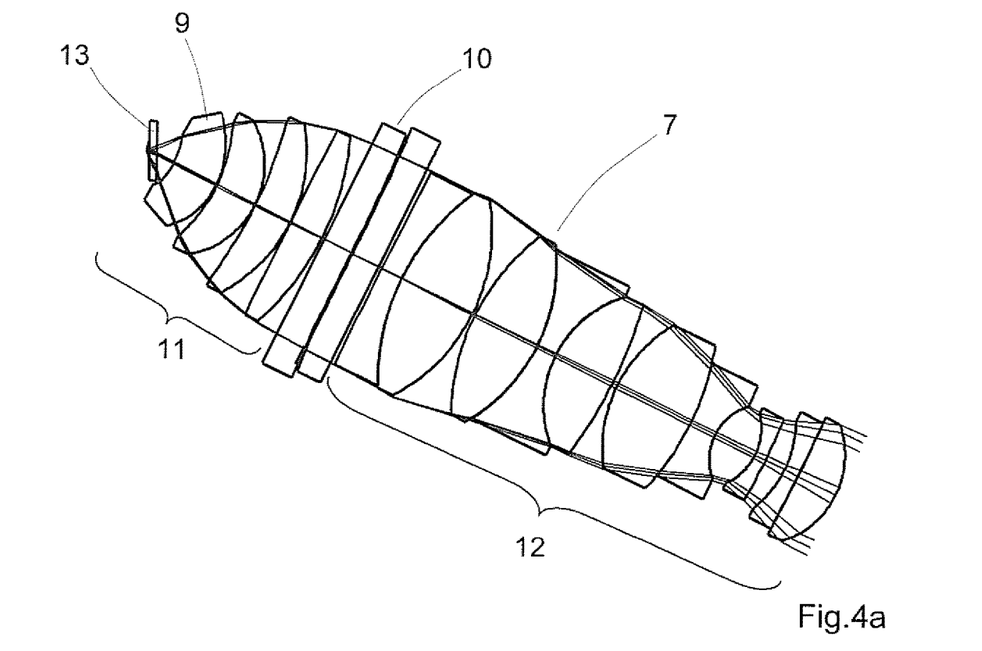
Figure 4B:
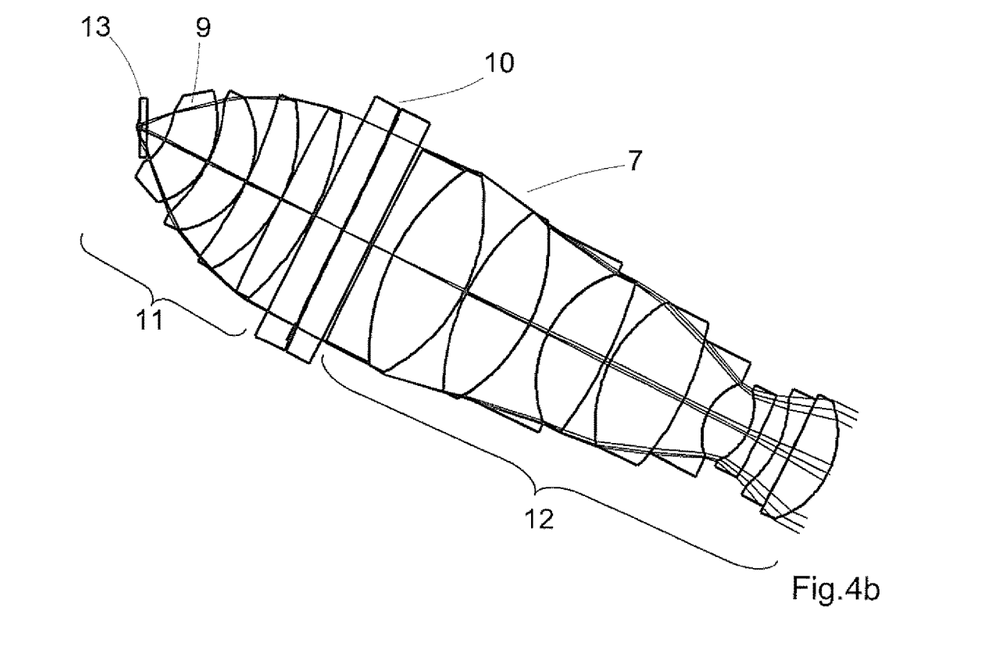
Figure 4C:
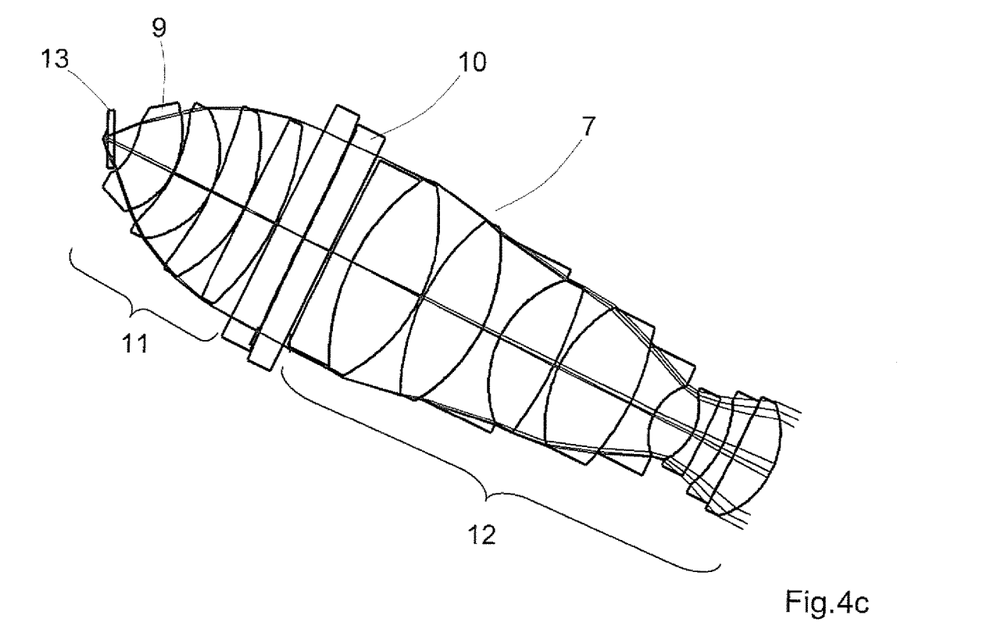
Figure 5A:
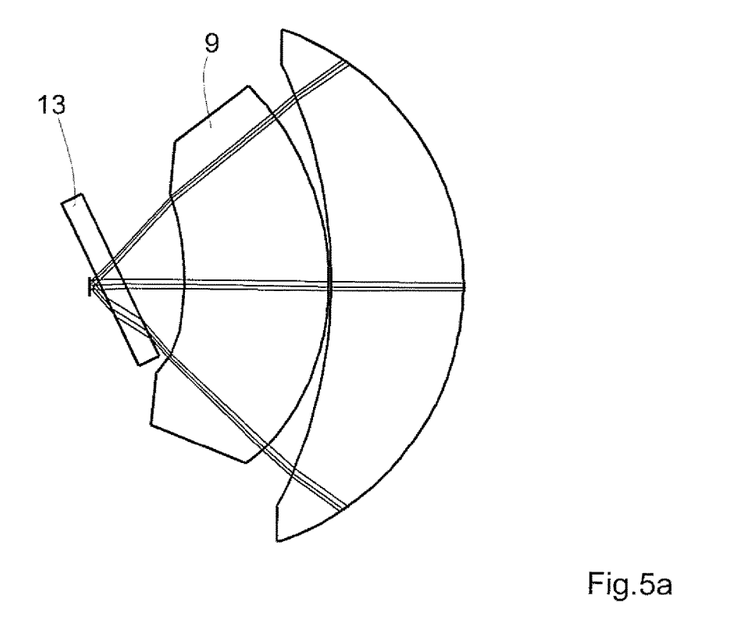
FIGS. 5a-5c shows details of the beam path in the region of the detection corrective lens for the settings of the wavefront manipulator that are shown in FIGS. 4a-4c.
Figure 5B:
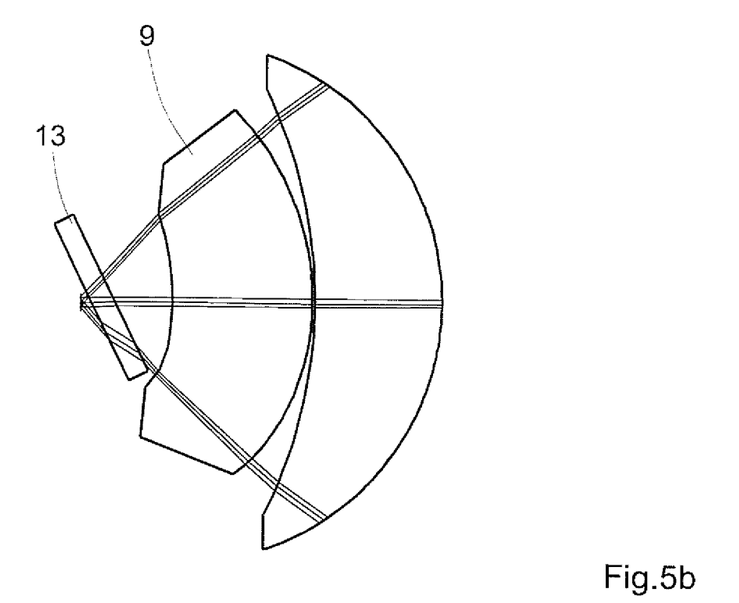
Figure 5C:
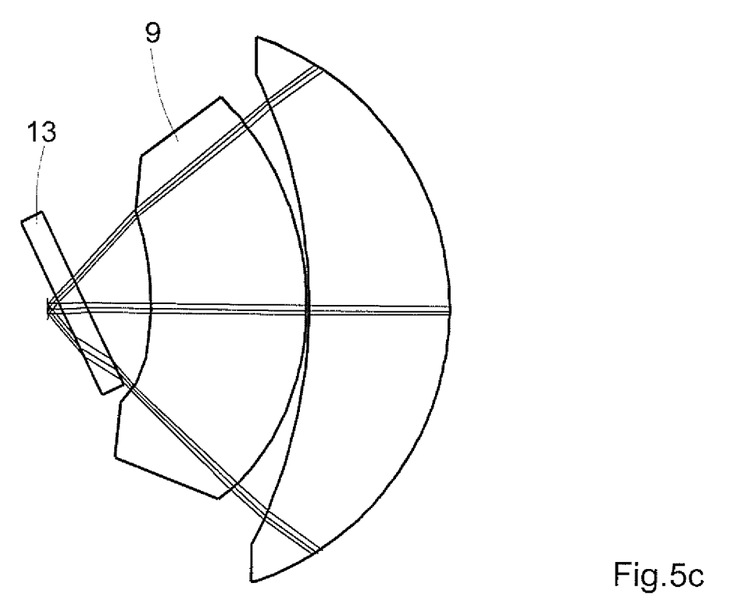

A second embodiment example is shown in a general view in FIGS. 4a-4c and in section in FIGS. 5a-5c for the front region. In contrast to the construction shown in FIGS. 2 and 3, the detection objective 7 for light sheet microscopy shown here is dimensioned through the 0.5 mm-thick vessel bottom 13 of a petri dish. In this case also, the primary optical axis of the detection objective 7 and the normal lines of the reference surface 4 form an angle of 26°. As in the first embodiment example which was described in connection with Table 1, this angle was selected arbitrarily and only as an example to demonstrate operation. Larger incident angles of 32°, for example, are also possible. The detection objective 7 in the present case likewise has a numerical aperture NA of 1.0 and a 40-fold magnification with an object-side image field diameter of 0.2 mm. Water is also used as immersion medium. It also comprises a detection corrective lens 9 having appreciably larger surface inclination angles and free-form profile depths compared to the detection corrective lens shown in FIGS. 2 and 3. It is configured to compensate practically completely for the influence of the vessel bottom 13 of the petri dish which is traversed obliquely under an angle of 26°. However, the base of the petri dish is appreciably thicker than the coverslip used in the first embodiment example so that somewhat greater residual error influences remain. The detection objective 7 which is shown in FIGS. 4 and 5 again includes a wavefront manipulator 10 comprising two free-form elements which are moved transverse to one another and which are suitable for refocusing inside a sample depth of ±50 μm at an average wavelength of 500 nm. The absolute focal distance of the sharply focused planes in the sample space vary from 2.2 mm to 2.3 mm as measured from the upper side of the vessel bottom 13.

As with the detection objective 7 shown in FIGS. 2a-2c, the detection objective 7 shown in FIGS. 4a-4c likewise comprises a first detection lens group 11 downstream of the detection corrective lens 9. The detection corrective lens 9 can also be a part of the first detection lens group 11. The first detection lens group 11 images an object-side image field 11 in infinity. The detection objective 7 further comprises a second detection lens group 12 which is preferably constructed to be afocal so that a tube lens system can be connected to it. An adaptive optical detection focusing element, a wavefront manipulator 10, is arranged between the first detection lens group 11 and the second detection lens group 12. An immersion medium can be introduced between the free-form surfaces of the wavefront manipulator 10 which are movable opposite one another, however, in both of the examples from FIGS. 2a-2c and FIGS. 4a-4c, air is located between these surfaces.

The optical design data for the detection objective 7 shown in FIGS. 4a-4c, 5a-c are listed in Table 6.

TABLE 6

Objective data for the second embodiment example (FIGS. 4a-c, FIGS. 5a-c)

| No. | Y Radius | Thickness/Space | Glass type/Medium | Half-diameter | Non-centered data |
|---|---|---|---|---|---|
| Object | ∞ | 02000 | 'W23' | 0 | |
| 1 | ∞ | 0.0000 | 'W23' | 1.1 | Basic Decenter |
| 2 | ∞ | 0.5000 | K5 | 1.1 | |
| 3 | ∞ | 0.000 | 'W23' | 1.9 | |
| 4 | ∞ | 1.3151 | 'W23' | 1.0 | Basic Decenter |
| 5 | −50.5238 | 3.2294 | SLAH58 | 20 | Decenter & Return |
| 6 | −5.7892 | 0.0500 | | 3.9 | Decenter & Return |
| 7 | −11.0100 | 2.9446 | SFPL53 | 4.4 | |
| 8 | −6.0013 | 0.0200 | | 5.1 | |
| 9 | −28.8901 | 2.6092 | SFPL53 | 6.1 | |
| 10 | −10.4976 | 0.0200 | | 6.5 | |
| 11 | 762.0778 | 2.3473 | SFPL53 | 7.0 | |
| 12 | −18.5588 | 0.2000 | | 7.3 | |
| 13 | ∞ | 0.0000 | | 7.5 | Basic Decenter |
| 14 | ∞ | 2.0000 | NLASF44 | 7.5 | |
| 15 | ∞ | 0.0000 | | 7.5 | |
| 16 | ∞ | 0.0000 | | 7.3 | Basic Decenter |
| Diaphragm | ∞ | 0.1000 | | 7.0 | |
| 18 | ∞ | 0.0000 | | 7.6 | Basic Decenter |
| 19 | ∞ | 2.0000 | NLASF44 | 7.6 | |
| 20 | ∞ | 0.0000 | | 7.6 | |
| 21 | ∞ | 0.0000 | | 7.3 | Basic Decenter |
| 22 | ∞ | 0.2000 | | 7.3 | |
| 23 | 326.2293 | 1.5000 | NKZF511 | 7.3 | |
| 24 | 14.9519 | 5.3676 | SFPL53 | 7.4 | |
| 25 | −12.5201 | 0.2000 | | 7.6 | |
| 26 | 15.2010 | 4.6527 | SFPL53 | 6.8 | |
| 27 | −12.2645 | 1.4000 | NKZF511 | 6.5 | |
| 28 | 7.6708 | 4.2387 | SFPL53 | 5.7 | |
| 29 | −31.6920 | 0.3584 | | 5.7 | |
| 30 | 9.5134 | 5.5986 | SNBH53 | 5.4 | |
| 31 | −17.3976 | 1.8434 | NKZFS2 | 4.3 | |
| 32 | 3.8076 | 3.0034 | | 2.8 | |
| 33 | −4.0995 | 0.8000 | NKZF54 | 2.7 | |
| 34 | −49.2892 | 1.4283 | | 3.2 | |
| 35 | −7.5925 | 1.0000 | NKZF58 | 3.4 | |
| 36 | −114.7567 | 2.8535 | NLAK8 | 4.2 | |
| 37 | −6.0984 | 0.0200 | | 4.6 | |
| 38 | ∞ | 126.5000 | | 4.5 | |
| 39 | 189.4170 | 10.9000 | NBALF4 | 7.9 | |
| 40 | −189.4170 | 60.0000 | | 7.9 | |
| 41 | ∞ | 80.0000 | | 6.6 | |
| 42 | ∞ | 48.2000 | NBK7 | 5.4 | |
| Image | ∞ | 0.0000 | | 4.4 | |

The object-side surface of the vessel bottom again has surface number 2. An aperture diaphragm, not shown, is also located between lens surface 16 and lens surface 18 here. The object-side surface number of the detection lens 9 is 5, and the surface number of the surface remote of the object is 6. The free-form surfaces of the wavefront manipulator 10 again have numbers 15 and 19. When a value of "∞" is given as radius, it is a plane surface. As with the y radius, the thickness is given in mm; the semi-aperture is given in degrees. With the exception of free-form surfaces 5, 6, 15 and 19, all of the surfaces are spherical or plane. The refractive indices of the utilized optical media are again specified for some selected wavelengths in Table 2. With respect to the decentering data, in the case of surface 1 in Table 6, ADE=26.00, and all other values are zero. In case of surface 4, ADE=−26.00 and YDE=−0.233, all of the other values are zero.

The polynomial coefficients of the object-side free-form surface of the detection corrective lens 9 are indicated in Table 7.

TABLE 7

Polynomial coefficients, front free-form surface of the detection corrective lens 9

| | | | | | |
|---|---|---|---|---|---|
| Y: | −7.4104E−02 | X2: | −6.1791E−01 | Y2: | −6.7701E−01 |
| X2Y: | 4.9894E−03 | Y3: | 7.7251E−03 | X4: | −3.5997E−03 |
| X2Y2: | −7.9746E−03 | Y4: | −4.4505E−03 | X4Y: | −1.8385E−04 |
| X2Y3: | −5.2709E−04 | Y5: | −8.3091E−04 | X6: | −3.4909E−05 |
| X4Y2: | −4.4370E−04 | X2Y4: | −9.3741E−04 | Y6: | −5.3721E−04 |
| X6Y: | 2.1565E−04 | X4Y3: | 8.7263E−04 | X2Y5: | 1.3599E−03 |
| Y7: | 7.6398E−04 | X8: | −5.6173E−05 | Y6: | −2.6477E−04 |
| X4Y4: | −5.0864E−04 | X2Y6: | −514824E−04 | Y6: | −2.1138E−04 |
| XDE: | 0.000000 | YDE: | 0.000000 | ZDE: | 0.000000 |
| ADE: | −4.397939 | BDE: | 0.000000 | CDE: | 0.000000 |

The polynomial coefficients and tilt angles of the rear free-form surface of the detection corrective lens remote of the object are given in Table 8:

TABLE 8

Polynomial coefficients, rear free-form surface of the detection corrective lens 9

| | | | | | |
|---|---|---|---|---|---|
| Y: | −1.2654E−01 | X2: | 3.4516E−03 | Y2: | 5.4734E−04 |
| X2Y: | −1.0811E−03 | Y3: | −8.8831E−04 | X4: | 4.2200E−05 |
| X2Y2: | −3.7175E−05 | Y4: | −8.4836E−05 | X4Y: | −1.7277E−05 |
| X2Y3: | −3.4851E−05 | Y5: | −2.3536E−05 | X6: | −2.4403E−07 |
| X4Y2: | −4.4743E−06 | X2Y4: | −8.6894E−06 | Y6: | −5.3688E−06 |
| X6Y: | 5.3090E−07 | X4Y3: | 2.3837E−06 | X2Y5: | 3.7312E−07 |
| Y7: | 1.9795E−06 | X8: | −9.9068E−08 | X6Y2: | −6.8055E−07 |
| X4Y4: | −1.5656E−06 | X2Y6: | −1.4937E−06 | Y8: | −4.6521E−07 |
| XDE: | 0.000000 | YDE: | 0.000000 | ZDE: | 0.000000 |
| ADE: | −7.681883 | BDE: | 0.000000 | CDE: | 0.000000 |

Finally, the polynomial coefficients of the two identical free-form surfaces of the wavefront manipulator 10 are given in Table 9:

TABLE 9

Polynomial coefficients of the free-form surfaces of the wavefront manipulator 10

| | | | | | |
|---|---|---|---|---|---|
| X2Y: | −9.8736E−04 | Y3: | −3.3167E−04 | X4Y: | 7.5993E−07 |
| X2Y3: | 5.5087E−07 | Y5: | 1.7984E−07 | X6Y: | 1.4421E−08 |
| X4Y3: | 1.3706E−08 | X2Y5: | 7.9007E−09 | Y7: | 1.6883E−09 |

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

LIST OF REFERENCE NUMERALS

1 sample vessel
2 medium
3 sample
4 reference surface
5 illumination objective
6 optical axis
7 detection objective
8 optical axis
9 detection corrective lens
10 wavefront manipulator
11 first detection lens group
12 second detection lens group
13 vessel bottom

The invention claimed is:

1. An arrangement for light sheet microscopy comprising:
    illumination optics comprising:
        an illumination objective configured to illuminate a sample with a light sheet via an illumination beam path, when the sample is located in a medium on a sample carrier that is aligned with respect to a plane reference surface;
        wherein an optical axis of the illumination objective and the light sheet lies in a plane which forms an illumination angle not equal to zero with normal lines of the plane reference surface;
    detection optics comprising:
        a detection objective in a detection beam path;
        wherein and optical axis of the detection objective forms a detection angle not equal to zero with the normal lines of the reference surface;
    a separating layer system comprising:
        at least one layer made of a predetermined material with a predetermined thickness which separates the medium from the illumination objective and the detection objective;
        wherein the separating layer system is configured to be aligned with and contact the medium by a base surface parallel to the reference surface at least in a region that is accessible by the illumination objective and the detection objective for illuminating and detecting; and
    a detection corrective lens system comprising:
        at least one detection corrective lens configured to reduce aberrations that occur as a result of light to be detected passing obliquely through interfaces of the separating layer system;
        wherein the at least one detection corrective lens is configured as a free-form lens, and is arranged between the detection objective and the separating layer system or forms a front lens of the detection objective.

2. The arrangement according to claim 1;
wherein the detection objective has a detection focusing device for internal focusing with simultaneous correction of spherical aberrations occurring during change of focus.

3. The arrangement according to claim 2;
wherein the detection focusing device includes at least a first adaptive optical detection focusing element that is arranged in, or can be inserted into, the beam path, configured to internally focus and simultaneously correct spherical aberrations occurring during a change of focus.

4. The arrangement according to claim 3;
wherein the detection objective comprises:
 a first detection lens group arranged downstream of the detection corrective lens configured to image an object-side image field to infinity and
 a second detection lens group; and
wherein the at least one adaptive optical detection focusing element is arranged between the first detection lens group and the second detection lens group.

5. The arrangement according to claim 1, further comprising:
an illumination corrective lens system comprising at least one illumination corrective lens configured to reduce aberrations occurring as a result of illumination light passing obliquely through interfaces of the separating layer system;
wherein the illumination corrective lens is designed as a free-form lens, and is arranged between illumination objective and separating layer system or forms the front lens of the illumination objective.

6. The arrangement according to claim 5;
wherein the illumination objective comprises an illumination focusing device configured to internally focus and simultaneously correct spherical aberrations occurring during a change of focus.

7. The arrangement according to claim 6;
wherein the illumination focusing device includes at least one adaptive optical illumination focusing element that is arranged in, or is configured to be inserted into, the beam path for internal focusing and simultaneous correction of spherical aberrations occurring during a change of focus.

8. The arrangement according to claim 6;
wherein the illumination objective comprises:
 a first illumination lens group, downstream of the illumination corrective lens, which is configured to image an object-side image field to infinity; and
 a second illumination lens group; and
wherein the at least one adaptive optical illumination focusing element is arranged between the first illumination lens group and the second illumination lens group.

9. The arrangement according to claim 3;
wherein the at least one adaptive optical detection focusing element and the at least one illumination focusing element are formed as wavefront manipulators.

10. The arrangement according to claim 4;
wherein the second detection lens group is constructed in an afocal manner;
wherein a third detection lens group is formed as a tube lens group and is formed as a tube lens group and is arranged downstream of the second detection lens group; and
wherein the detection objective is configured to generate a real intermediate image.

11. The arrangement according to claim 4;
wherein the first detection lens group with the detection corrective lens and the at least one layer of the separating layer system, and the first illumination lens group with the illumination corrective lens and the at least one layer of the separating layer system, respectively, forms an optical system which approximately meets the following condition:

$h_1 = f_{FG} \cdot \sin \sigma_0 = n_0 f_{FG}' \cdot \sin \sigma_0;$ wherein:
 $h_1$ is the incident height of the opening beam at the wavefront manipulator;
 $\sigma_0$ is the angle of inclination of the edge beam relative to the optical axis;
 $f_{FG} = -n_0 * f_{FG}'$ is the front object-side focal length of the front lens group; and
 $n_0$ is the refractive index of an immersion medium between object and front lens.

12. The arrangement according to claim 11;
wherein the first detection lens group and/or the first illumination lens group comprise(s) an aspherical lens.

13. The arrangement according to claim 2;
wherein a numerical aperture NA of the detection objective is at least 0.8.

14. The arrangement according to claim 6;
wherein the numerical aperture NA of the illumination optics is at most 0.6.

15. The arrangement according to claim 9;
wherein each of the wavefront manipulators comprises two free-form surfaces that are movable opposite one another lateral to the optical axis.

16. The arrangement according to claim 15;
wherein an immersion medium is introduced in each instance between the free-form surfaces of the wavefront manipulators which are movable opposite one another.

17. The arrangement according to claim 15;
wherein the optical elements, at which the free-form surfaces are formed, are fabricated from a material with anomalous partial dispersion.

18. The arrangement according to claim 16;
wherein the immersion medium has a dispersion curve which deviates from the normal line.

* * * * *